US007634853B2

(12) United States Patent
Nguyen (10) Patent No.: US 7,634,853 B2
(45) Date of Patent: Dec. 22, 2009

(54) APPARATUS FOR PRECISELY ALIGNING AND SECURING PLURAL PLATES TOGETHER

(75) Inventor: Charles Nguyen, Fremont, CA (US)

(73) Assignee: Advanced Precision Machining, Inc., Santa Clara, CA (US)

( * ) Notice: Subject to any disclaimer, the term of this patent is extended or adjusted under 35 U.S.C. 154(b) by 824 days.

(21) Appl. No.: 11/182,415

(22) Filed: Jul. 15, 2005

(65) Prior Publication Data

US 2007/0011856 A1 Jan. 18, 2007

(51) Int. Cl.
*B23P 21/00* (2006.01)
*B23P 19/04* (2006.01)
(52) U.S. Cl. .................... 29/703; 29/407.09; 29/407.1; 29/721; 29/283; 29/284
(58) Field of Classification Search .................. 29/703, 29/721, 806, 242, 243, 244, 259, 261, 262, 29/265, 283, 284, 271, 252, 253, 407.09, 29/407.1
See application file for complete search history.

(56) References Cited

U.S. PATENT DOCUMENTS

| 718,066 | A | * | 1/1903 | McWilliams | 294/86.25 |
|---|---|---|---|---|---|
| 1,893,414 | A | * | 1/1933 | Johnson et al. | 29/275 |
| 2,271,879 | A | * | 2/1942 | Wallace | 269/48.4 |
| RE26,798 | E | * | 2/1970 | Brodie | 29/261 |
| 3,588,983 | A | * | 6/1971 | Hoy | 29/764 |
| 4,195,398 | A | * | 4/1980 | Matthews | 29/262 |
| 5,048,805 | A | * | 9/1991 | Wiseman | 269/48.4 |
| 5,224,254 | A | * | 7/1993 | McPeak et al. | 29/261 |
| 5,321,875 | A | * | 6/1994 | Hoffman et al. | 29/271 |
| 5,419,027 | A | * | 5/1995 | McPeak et al. | 29/252 |
| 6,000,243 | A | | 12/1999 | Davidson et al. | |
| 6,339,516 | B1 | | 1/2002 | Martin et al. | |

(Continued)

FOREIGN PATENT DOCUMENTS

EP 0 183 310 A1 6/1986

(Continued)

*Primary Examiner*—Jermie E Cozart
(74) *Attorney, Agent, or Firm*—Haynes and Boone, LLP (57) ABSTRACT

Two or more plates, each having a matching alignment hole, are precisely aligned and mated together by an aligning and clamping device that includes: (a) a plurality of movable aligning fingers, retraction means for causing the aligning fingers to move into a retracted state where they occupy a first volumetric space sufficiently small to allow the two or more plates to be moved over the retracted fingers so as to have their respective alignment holes surrounding the retracted aligning fingers; (b) expansion means for use after the plates have been moved over the fingers, the expansion means urging the fingers to expand outwardly to occupy a second volumetric space greater than the first volumetric space such that the fingers begin to contact and begin to improve co-alignment between the surrounding alignment holes; and (d) clamping means for use after the alignment holes of the plates have begun to come into improved co-alignment, the clamping means applying a clamping force for clamping the two or more mateable plates together as their respective alignment holes remain in alignment or continue to improve in co-alignment. The aligning and clamping device may further include: (e) fluid removing means for removing at least one of air and other fluids from between the plates as the plates are urged into clamped alignment with one another.

12 Claims, 5 Drawing Sheets

U.S. PATENT DOCUMENTS 6,483,661 B1 11/2002 Martin et al.
6,874,219 B2 4/2005 Hanssen et al.

FOREIGN PATENT DOCUMENTS

| | | | |
|---|---|---|---|
| EP | 0 942 180 A1 | 9/1999 |
| WO | WO 84/04621 | 11/1984 |
| WO | WO 96/06738 | 3/1996 |
| WO | WO 00/63902 | 10/2000 |

\* cited by examiner

APPARATUS FOR PRECISELY ALIGNING AND SECURING PLURAL PLATES TOGETHER

FIELD OF DISCLOSURE

The present disclosure of invention relates generally to a process for precisely aligning two or more plates together (or other mateable objects together) and clamping them closely together in precise and closely mated alignment with one another and also with a reference axis.

DESCRIPTION OF RELATED ART

There are instances where it is desirable to precisely align two or more plate-like objects (or more broadly, mateable solid objects) one next to the other and to temporarily clamp them closely together in precise, parallel or other alignment with one another, and optionally, also in alignment with a reference axis. An example is in the field of computer readable storage disks (e.g., optical and/or magnetic) where during manufacture or testing it may be desirable to precisely clamp plural ones of such disks one on the next, with essentially no space left between them, so that exposed surfaces of the disks can be simultaneously coated with a thin film material and/or so that exposed surfaces of the disks can be simultaneously tested and/or modified for conformance with certain manufacturing criteria (e.g., surface planarity, surface homogeneity, etc.).

This is not a trivial problem. Depending on the material compositions and surface attributes of the inwardly-touching surfaces of the clamped-together object surfaces, a significant amount of friction or other binding force may develop that prevents the objects from being moved into precise alignment with one another and/or a reference positioning frame (e.g., a central axis). Air, oils or other fluids may become trapped between the inwardly-touching surfaces of the clamped-together object surfaces such that it becomes difficult or impossible to provide precise parallelism or other alignment between the outward, non-touching surfaces of the clamped-together objects.

SUMMARY

Structures and methods may be provided in accordance with the invention for precisely aligning and closely mating plural plates (or other closely mateable solid objects) to each other and optionally also relative to a reference positioning frame (i.e., axis) on a temporary or permanent basis.

A plates-clamping method in accordance with the present disclosure comprises: (a) first retracting, contracting, drawing together or otherwise decreasing volumetric space occupied by plural ones of movable aligning fingers so that two or more plates having precision alignment holes defined through the plates can be moved over the retracted fingers to have their respective alignment holes surrounding the retracted fingers; (b) after the plates are so moved, extending, expanding or otherwise increasing volumetric space occupied by plural ones of the movable aligning fingers so that the extending fingers begin to contact with and begin to co-align surfaces of the surrounding alignment holes while also beginning to draw the mateable plates into closer mating relationship with one another; and (c) slowly removing air and/or other fluids from between the plates and simultaneously urging the movable aligning fingers to continue to expand and co-align the plates by way of their respective alignment holes while also continuing to urge the plates closer together such that as said air and/or other fluids decreases between the plates, the respective alignment holes of the plates remain aligned and the plates are drawn even closer together.

An alignment mechanism in accordance with the present disclosure comprises: (a) a plurality of movable aligning fingers; (b) retraction means for causing the aligning fingers to move closer to one another (to retract) so that two or more mateable objects having precision alignment holes defined through the objects can be moved over the retracted fingers to have their respective alignment holes surrounding the more closely spaced together aligning fingers; (c) expansion and clamping means for use after the objects have been moved over the fingers, the expansion and clamping means urging the fingers to expand outwardly to contact and begin to co-align surfaces of the surrounding alignment holes and to slowly apply a clamping force for simultaneously clamping the two or more mateable objects together as their respective alignment holes are aligned by the outwardly urged fingers; and (d) fluid removing means for slowly and uniformly removing air and/or other fluids from between the objects as the objects are urged into clamped alignment.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Figure 1:
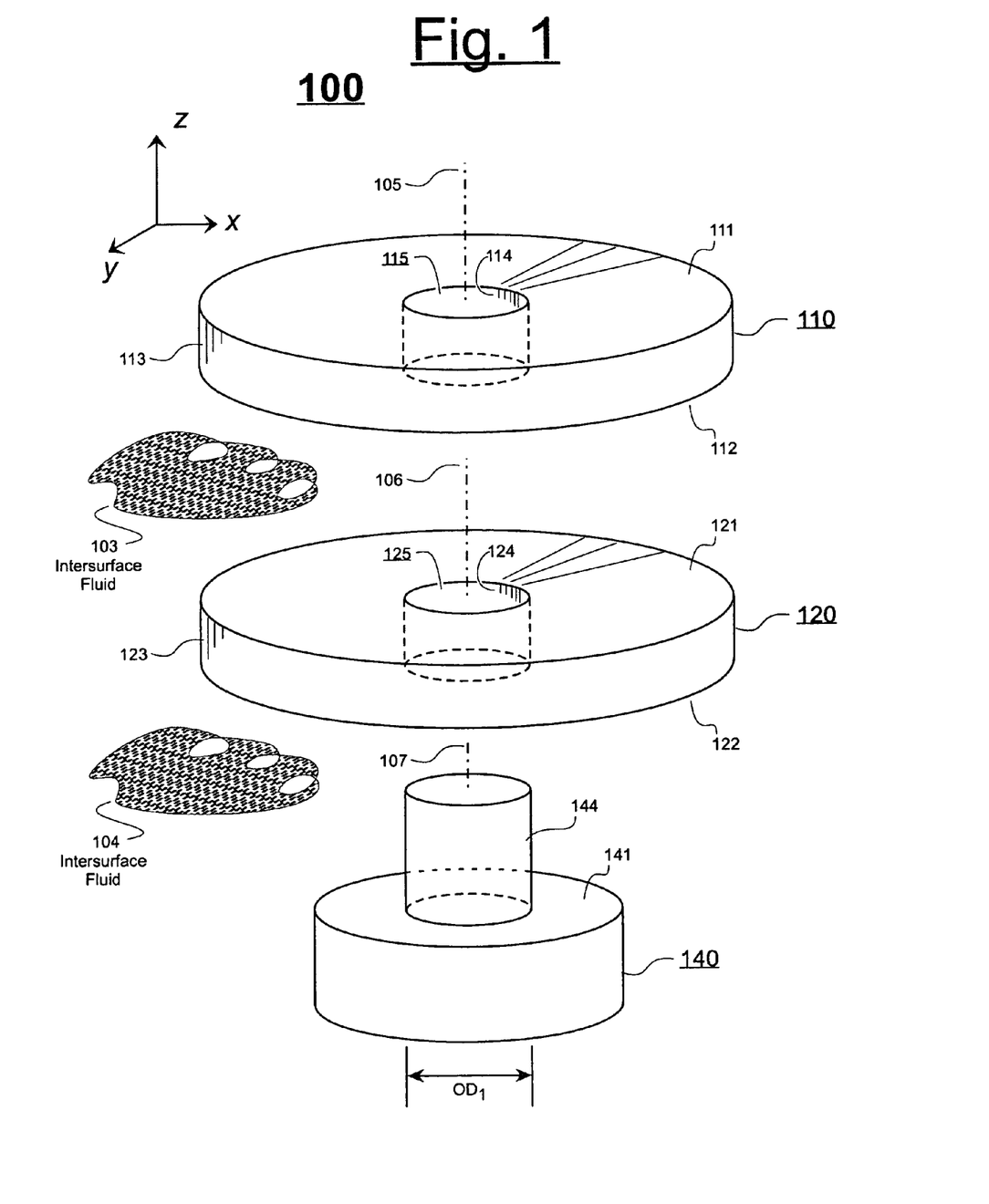
FIG. 1 is a perspective schematic diagram used for explaining problems encountered in trying to precisely align two plates (e.g., disks with concentric and cylindrical alignment openings) and to clamp the plates together while temporarily securing the plates to a rotating post.

FIG. 1 is a perspective schematic diagram used for explaining problems encountered in trying to precisely align and mate two mateable objects, for example, the illustrated planar disks, 110 and 120, which have respective concentric and cylindrical alignment openings 115 and 125 defined therethrough. More specifically, the goal is to temporarily clamp the objects (e.g., plates) together while also temporarily securing the plates in precise orthogonal and centered disposition relative to the central axis 107 of a rotatable post 144. Although the exemplary plates 110, 120, are shown as cylindrical solids each having an identical cylindrical and concentric alignment opening 115, 125 respectively defined through it, the invention is not limited to just these shapes. It will be appreciated that a broad range of solid and precisely-mateable objects, whether planar or not, may be brought into precise alignment and close mating with one another by using the techniques disclosed herein.

While common sense might suggest that disks 110 and 120 can simply be dropped onto a post 144 of matching size so that the disks are supported by orthogonal flange surface 141 and centered by post 144, common sense would be wrong in this instance. It is not realistically possible to do this. Non-negligible spacing must be provided between the outer diameter ($OD_1$) of the post 144 and the inner diameters of the respective and identical openings, 115 and 125, so that the respective inner surfaces 114 and 124 of the openings can physically slip over the outer diameter surface of the post 144 and the disks can then come to rest on flange surface 144. Otherwise it will not be generally possible to slip disks 110 and 120 onto post 140 due to friction between sliding surfaces, machining tolerance limitations and other such limitations. The required spacing between $OD_1$ and the inner diameters of holes 115, 125 allows the respective, central vertical axes (Z-direction axes), 105, 106, 107 of the disks 110, 120 and the post holding device 140 to be misaligned relative to one another. Additionally, if there is fluid, 103 or 104, trapped between the to-be-mated objects; namely, a first intersurface fluid 103 between a bottom surface 112 of disk 110 and a top surface 121 of disk 120, or a second intersurface fluid 104 between a bottom surface 122 of disk 110 and a top surface 141 of the post holding device 140, then the objects may be tilted relative to one another and the top surface 111 of disk 110 will not be precisely parallel to the bottom surface 122 of disk 120 or it will not be precisely parallel to the top surface 141 of the post holding device 140. Thus, they may not be perfectly mated one to the next. Such precise parallelism may be a requirement in certain testing and/or manufacturing processes. Incidentally, the intersurface fluids, 103 and 104, may each be one or more of various gases and/or liquids such as ambient air, water and machining or lubricating oils.

Figure 2A:
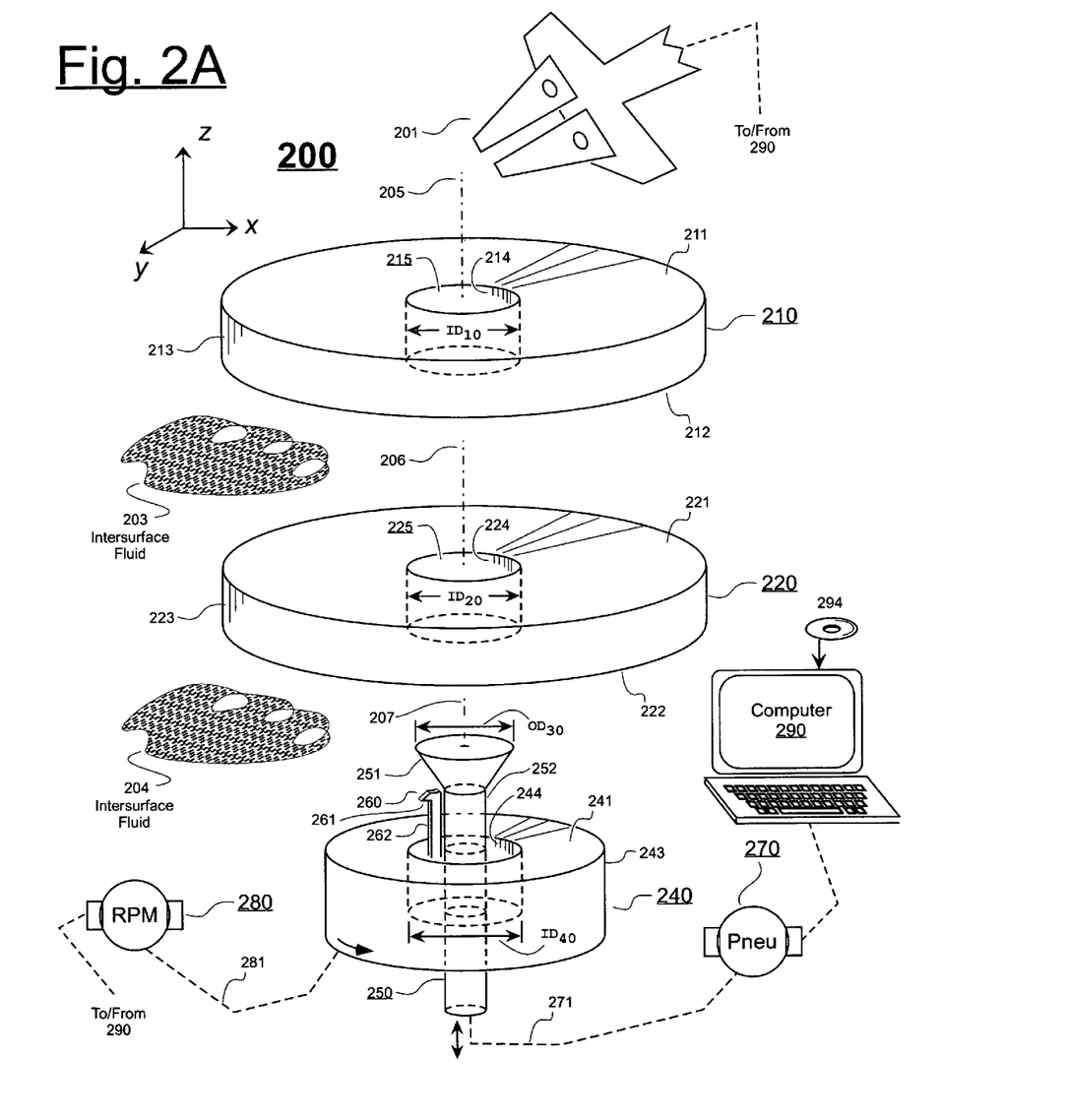
FIG. 2A is a perspective schematic diagram used for introducing a first embodiment of a clamping and aligning chuck structured in accordance with the invention.

Referring to FIG. 2A, a first embodiment 200 in accordance with the invention is shown. Like reference symbols and numbers in the "200" century series are used for elements of FIG. 2 which correspond to, but are not necessarily the same as the elements represented by similar symbols and reference numbers of the "100" series in FIG. 1. As such, an introductory description for common ones of the elements found in FIG. 2 is omitted here.

Within embodiment 200 there is provided an aligning and clamping device 240 that includes a vertically reciprocating post 250. A robotic arm 201 automatically deposits each of disks 210 and 220 over post 250. (Later, after alignment and clamping, the robotic arm 201 may be used to automatically remove the disks 210 and 220 from the post 250.) Post 250 projects above lateral platter 241. An above-the-platter portion of post 250 has a maximum outer diameter, $OD_{30}$ that is substantially smaller than the inner diameters, $ID_{10}$ and $ID_{20}$ of the respective and identical alignment holes 215, 225 of respective disks 210 and 220. As such, the respective alignment holes 215 and 225 of the disks can easily slip over the smaller volumetric space occupied by of the above-the-platter portion of the lifted post 250. The slipped over disks 210 and 220 can come to rest on the top platter surface 241 of the aligning and clamping device 240.

An inverted, frusto-conical cam 251 is provided at the top of the vertically reciprocating post 250 (reciprocates along the Z-axis direction). A computer actuated, reciprocation control means 270 (e.g., an electrically controlled fluid valve) is provided for selectively urging the frusto-conical cam 251, and the remainder of the post 250 to move up or down. In the illustrated example, the reciprocation control means 270 includes a pneumatic reciprocating means which uses either pressurized air or a low viscosity liquid (e.g., hydraulic oil) to selectively urge a piston at the bottom of post 250 up or down. A control computer 290 may be operatively coupled to the reciprocation control means 270 as well as to the robotic arm 201 and/or to a rotation-providing motor means (280, described below) for automating the operations of these computer controllable components. Manufactured instructing signals 294 may be provided on a disk and/or supplied by other means (e.g., network) for instructing the computer to automatically carry out the aligning and clamping operations described herein. In one embodiment, a helical spring (not shown, see FIG. 3) urges post 250 down while pressurized air is provided by way of path 271 to overcome the spring force and to push the post 251 up. In an alternate embodiment, reciprocation control means 270 applies a vacuum force (e.g., air at less than ambient pressure) to urge the post and its attached cam 251 downwardly. As the cam 251 is brought down towards the top platter surface 241 of the aligning and clamping device 240, the cam 251 engages with a plurality of alignment fingers 260 which are normally urged by spring means (not shown) or otherwise to contract (retract) towards the central axis 207 of device 240. Only one such alignment finger 260 is shown in FIG. 2A for purpose of avoiding illustrative clutter. However, it may be appreciated that a plurality of such alignment fingers 260 are provided uniformly about and leaning inwardly towards the stem portion 252 of post 250. The number of such plural fingers can vary from application to application. By way of nonlimiting examples, the number of fingers may be 4, 6, 8, 12 or 16. The fingers 260 are retained within a concentric opening 244 of a rotatable main body 243 of device 240, where the opening 244 has an inner diameter, $ID_{40}$ which is substantially greater than the inner alignment diameters, $ID_{10}$ and $ID_{20}$ of the to-be deposited and aligned disks, 210 and 220. This larger diameter of opening 244 allows the alignment fingers 260 (one shown) to be easily urged to expand outwardly, away from central axis 207 and to resiliently engage against the inner alignment surfaces 214 and 224 of the disks after the disks have been deposited (201) over the upwardly-lifted post 250 and as cam 251 is brought down to bear on the alignment fingers 260. The maximum outer diameter for the above-the-platter portions of the fingers 260 at the time that the disks are deposited is kept at substantially less than the inner alignment diameters $ID_{10}$ and $ID_{20}$ of the deposited plates 210 and 220. Thus the deposited solid objects, 210 and 220 can easily slip over the retracted fingers 260 as well as over the inverted-cone shaped cam 251 of the upwardly projected post 250.

After the robotically deposited disks are deposited over post 250 to rest on platter surface 241, the reciprocation control means 270 (e.g., one or more pneumatic control valves) is actuated to slowly begin lowering the inverted, frusto-conical cam 251 down towards top surface 241 of the alignment and clamping device 240. The outer surface of cam 251 begins to engage with the inner top surfaces of fingers 260 (only one shown) to thereby begin to resiliently urge those fingers 260 to expand outwardly and to also begin moving in a downward direction. As can be seen, each of the alignment figures in this embodiment 200 has an upper hook portion 261 which is fashioned to engage with the top surface 211 of the top most plate 210, just slightly outward of the inner diameter of the upper alignment hole, 215, so as to begin pulling plate 210 down closer towards the platter surface 241 of the alignment and clamping device 240. See also FIG. 2B. Moreover, each finger 260 has an alignment engagement surface 262 which engages resiliently against the inner surfaces 214 and 224 of the respective alignment holes so as to urge the plates 210 and 220 to slip relative to one another so that there respective alignment holes 215 and 225 begin to come into precise alignment with one another.

In one embodiment, alignment, centering and clamping does not yet complete at this stage because intersurface fluids such as 203 and 204 are generally still present between the mateable and respective bottom and top surfaces of the to-be-mated plates. In one embodiment, the respective surfaces pairs, 212-221 and 222-241 are precisely machined to be extremely planar. The specific amount of precision will vary from application to application. Ideally the plane surfaces should mate very tightly one next to the other. However, ambient air or other fluids may become trapped between the respective surfaces pairs, 212-221 and 222-241, and may therefore prevent the surfaces from perfectly mating one with the other. In accordance with the invention, a fluid-removal means is provided for removing substantial amounts of these intersurface fluid pools 203 and 204 so that the to-be-clamped together plates 210 and 220 can come into yet closer mating contact with one another, and/or with the upper platter surface 241 of the clamping device 240. The specific amount of intersurface fluid(s) that needs to be removed will vary from application to application. It should be appreciated that, as removal of the intersurface fluid pools, 203 and 204, proceeds; stiction and/or other intersurface forces may come into play between the mating solid surfaces and may create a relatively large friction force between the mating surfaces, 212-221 and 222-241, such that it becomes extremely difficult to further shift the plates 210 and 220 relative to one another or relative to the top platter surface 241 of the clamping device 240. Therefore, while slippage between the plates (210, 220) and/or the platter (241) is still substantially possible, it is important that the alignment and centering mechanisms continue to provide their respective alignment and centering functions as the intersurface fluids 203 and 204 are removed from between respective surface pairs 212-221 and 222-241. In one embodiment, a high-speed motor 280 is used to rotate the tool 240 about its vertical axis 207 at a speed sufficient to centrifically urge the intersurface fluids 203 and 204 out from between the spaces of the mating surface pairs 212-221 and 222-241. It has been found, for one embodiment, that a rotational speed of at least about 7500 RPM (revolutions per minute) is needed for adequately removing intersurface air pockets from between the disks. The specific amount of centrifical force needed and/or the minimum rotational speed used for achieving such centrifical force may vary from application to application. The centrifical ejection force increases as the speed of the motor 280 increases. Thus, removal starts slowly and increases smoothly as the rotational velocity of the device 240 is ramped up. Also, as gyroscopic effects come into play, the precision of centering between the respective central vertical axes 205, 206 and 207 of the various elements improves.

Accordingly, a downward and resilient urging force is applied to the post 250 (for example by a metal spring, not shown) during the ramp-up to full rotational speed so that the cam 251 will continue to be urged downwardly (in the −Z direction) to thereby continue to urge the fingers 260 downwardly and outwardly for maintaining the aligning, the centering and the clamping forces against the objects 210 and 220 that are being clamped together. In one embodiment, the up and/or down force coupling means 271 that is provided between the bottom surface of the post 250 and the reciprocation control means 270 and is composed of air or a low viscosity liquid so that the bottom of the post 250 may easily rotate at high speed when so powered by motor 280. The force coupling means 281 between the rotating motor 280 and the clamping device 240 may be any appropriate one for assuring that the device 240 and its loaded-on disk 210 and 220 may be spun to a sufficiently high velocity while maintaining gyroscopic ability and centrifugally ejecting (or otherwise ejecting) the inter surface fluids 203 and 204. In one embodiment, the main body portion 243 of the clamping device also functions as the high speed rotor of an electromagnet motor (e.g., 280). Of course, in such a case, it is assumed that the disks 210-220 are immune to magnetic flux from the stator-rotor gap (e.g., optical disks) or the disks are adequately shielded.

After alignment and clamping is achieved, the rotation providing motor means 280 may continue to rotate the clamp-on disks at a desired speed for carrying out subsequent testing and/or manufacturing processes on the aligned and clamped-together disks 210 and 220. After the optional testing and/or other manufacturing processes are carried out on the spinning disks 210-220, the driving motor 280 may be slowed down to a stop or to a relatively slow speed and the reciprocation control means 270 may be activated to begin lifting cam 251 upwardly again, thereby releasing the fingers 260 from their pressing contact against the inner alignment surfaces 214 and 224 of the disks. The fingers 260 contract substantially away from the inner surfaces of the alignment holes as the post 250 continues to rise. Thereafter the disks 210 and 220 may be easily lifted by the robotic arm 210 or by other means off from the supporting surface platter 241 for further processing. In one embodiment, the supporting surface platter 241 is not as smoothly machined as are mating surfaces 212-221 of the disks and therefore it easier to pry the disks from surface 241 than to pry the disks apart from one another. It has been found in one embodiment that the disks 210 and 220 continue to remain stuck to one another due to various intersurface attracting mechanisms such as surface tensions and/or sub-atmospheric pressures. A knife or other device may be used to pry the disks apart if desired and if they had not been otherwise fastened together.

Figure 2B:
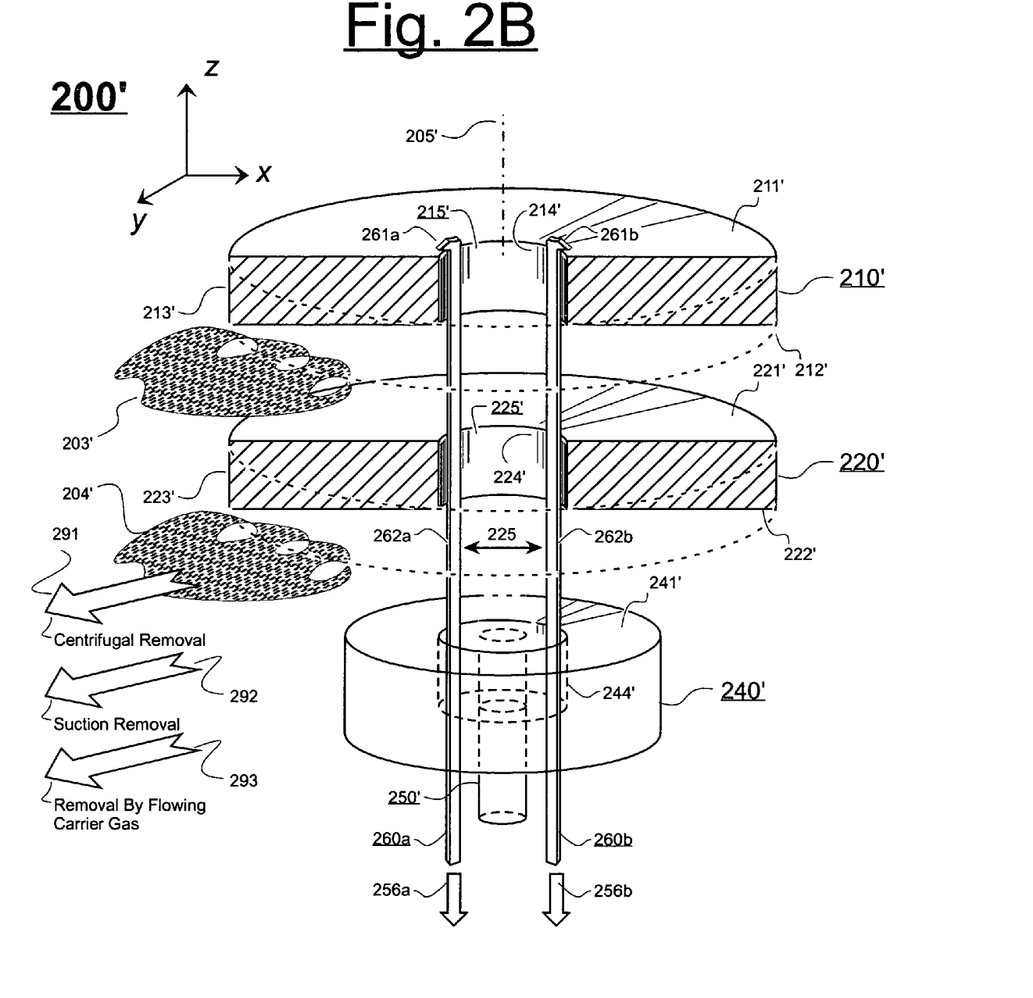
FIG. 2B is a perspective, cut-away schematic diagram used for explaining various methods that may be used alone or in combination with the first embodiment for uniformly removing intersurface fluids from between the plates as the plates aligned and urged closer to one another and/or to an aligning reference surface.

Referring to FIG. 2B, a cutaway sectional and perspective view is shown at 200' with two opposing ones of the alignment fingers, 260a and 260b being forcibly urged outwardly (this force being represented by double arrowed line 255) so that their respective alignment surfaces 262a and 262b resiliently engage against the respective inner surfaces 214' and 224' of the alignment holes 215' and 225'. At about the same time, the respective upper hooks 261a and 261b of the aligning and clamping figures are urged downwardly, as represented by uniform force arrows 256a and 256b. This urges the upper disk 210' down towards the upper platter surface 241' of the clamping device 240'. As can be seen, inner cavity 244' of the clamping device 240' is sufficiently wide to allow the alignment fingers 260a and 260b to press against the alignment surfaces 214' and 224' of the supplied disks 210 and 220 without being stopped by the inner surfaces of cavity 244'.

Aside from the already described centrifugal removal 291 of the intersurface fluids 203' and 204', one or more other mechanisms may be used in addition to, or as alternatives for, the centrifugal removal 291 of such intersurface fluids. Examples include suction removal 292 wherein vacuum suction is provided via either stationary openings disposed near the outer surfaces 213' 223' of the disks and/or by way of rotating holes (not shown) provided along the post stem 252 (FIG. 2A) and between the alignment fingers. Another additional or alternative method for removing the undesired intersurface fluids 203' and 204' is by flowing a carrier gas 293 either outwardly away from the disk or inwardly through the central post by way of holes (not shown) provided in the lifting stem 252 of the reciprocating post 250. The flowing gas or gasses should be ones that can absorb the undesired fluids 203' and 204' to an acceptable degree and move them away from the mating surface pairs, 212'-221' and/or 222'-241'. Examples of such carrier gases include but are not limited to purified nitrogen and/or helium which may be pre-heated and temporarily flowed past the mating surfabes 212'-221' and 222'-241' so as to absorb and remove the undesired intersurface fluids.

Figure 2C:
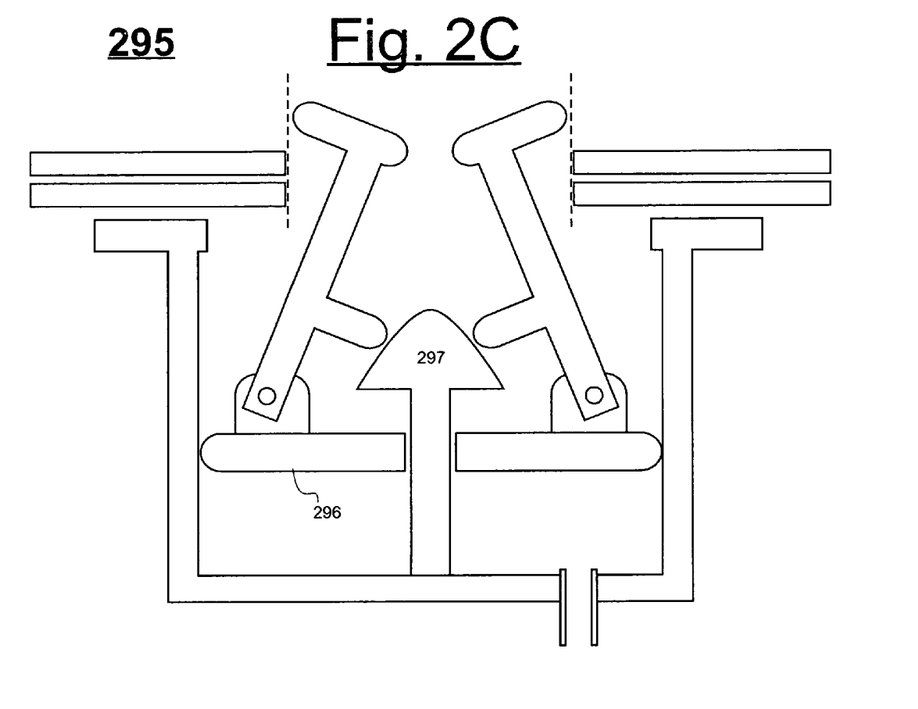
FIG. 2C is a cross sectional schematic diagram showing an alternate embodiment where the fingers support moves down while the fingers engage an upright conical cam.

Referring to FIG. 2C, a schematic cross section is shown of another embodiment 295. The fingers are pivotally supported on a pressure driven piston 296. An upright, conic-like cam forces the alignment fingers apart as the piston 296 is urged down, bringing the fingers down with it.

Figure 2D:
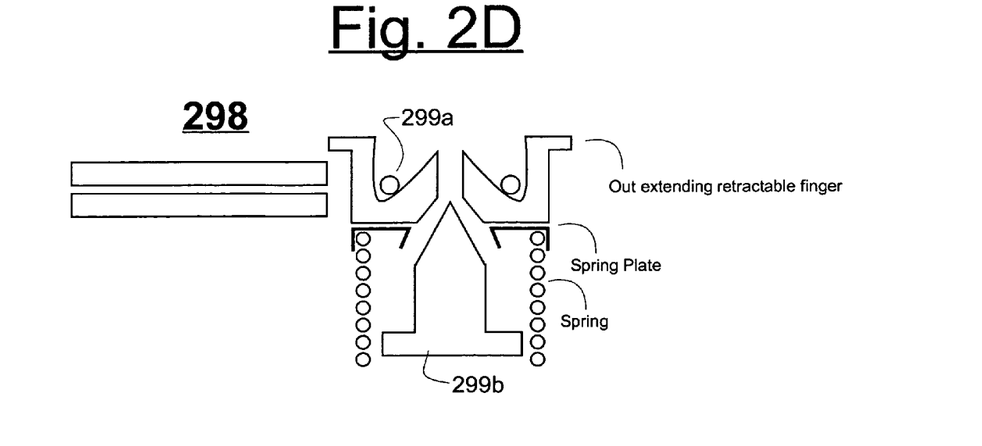
FIG. 2D is a cross sectional schematic diagram showing an alternate embodiment where the fingers slide outwardly on a spring-biased support while an upright conical cam moves up to urge the fingers out and down as cam surfaces of the fingers engage against a motion-guiding ring.

Referring to FIG. 2D, a schematic cross section is shown of yet another embodiment 298. A precision machined ring edge 299a of a cylindrical shell cap (not shown) is inserted over cam-shaped tails of opposingly directed alignment fingers, each shaped like a swan. The swans slidably rest against a spring supported slide plate. The spring and slide plate reside within a cylindrical shell (not shown) having slits machined at its top to allow the swans to slide outwardly and downwardly. This happens when cam driver 299b is moved upwardly between the swans under the urging of air pressure or otherwise. Of course, the illustrated arrangement tends to consume more volumetric space than does an integrated spring-in-finger embodiment next described with respect to FIG. 3. It is within the contemplation of the disclosure to have swan tails at different vertical heights so that the swan tails can overlap one another when the fingers are retracted. The cam driver 299b does not have to engage the very backs of the swans. It may engage more forward cam surfaces on the swans. FIG. 2D provides an easy to understand example.

Figure 3:
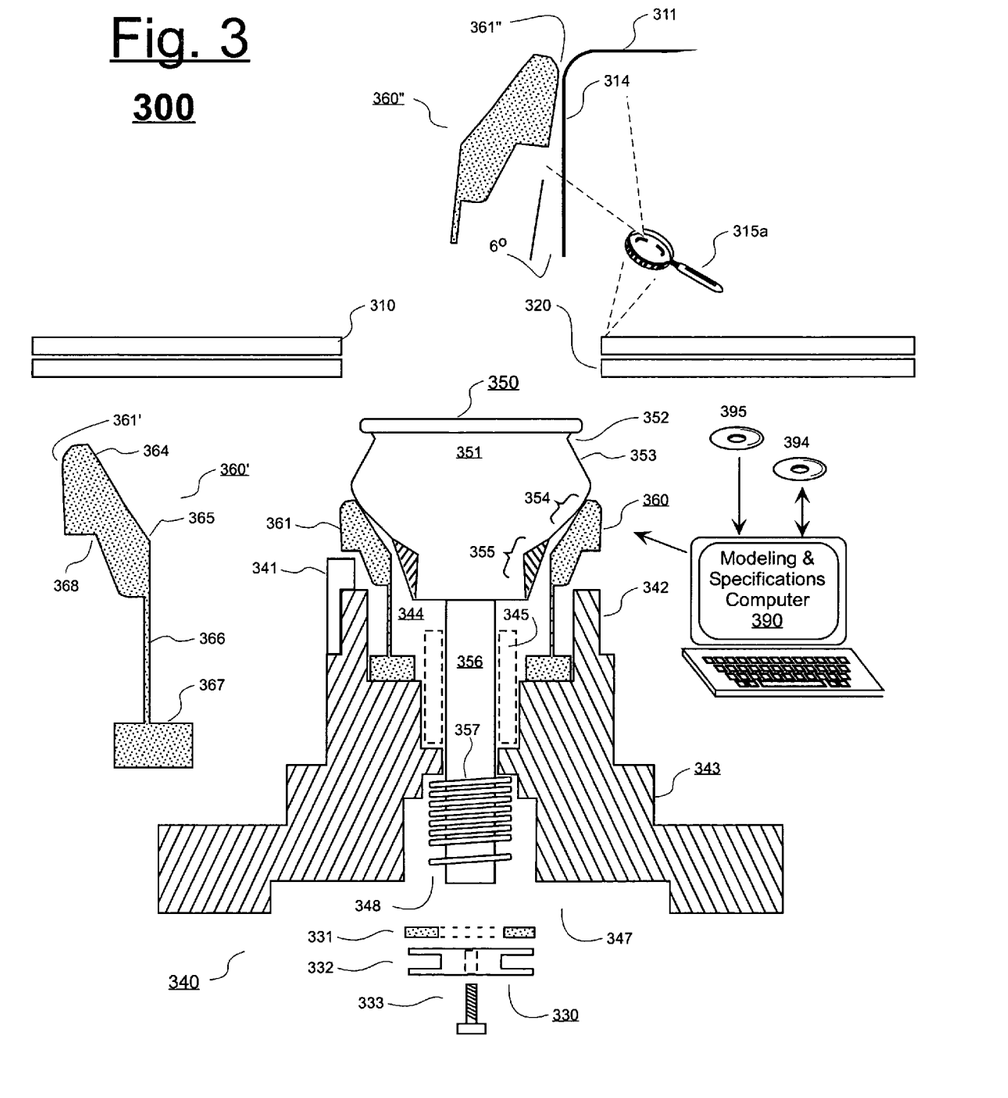
FIG. 3 is a cross sectional schematic diagram showing another embodiment.

Referring to FIG. 3, a cross sectional view is shown of yet another embodiment 300 in accordance with the invention. Where practical reference numbers in the "300" century series are used for alike elements which were enumerated in the "200" century series for FIGS. 2A and 2B. The reciprocating post 350 shown within the illustrated aligning and clamping device 340 is mostly made of a precision machined (lathed) stainless steel (e.g., SST 300 series) except for a low-friction hard plastic piece 355 (e.g., Torlon™—a high temperature Polyamide Imide well known in the industry) that is threaded or otherwise attached where shown. The support platter 341 onto which plates 310 and 320 will clamp in precision alignment is also made of stainless steel. The main body portion 343 of the aligning and clamping device 340 is machined (lathed and bored) from a cylindrical block of aluminum (e.g., 7075-T6). Stem portion 356 of the post 350 is slidingly guided by a low-friction bushing 345 that is press fitted into a matching and vertical recess provided centrally in body piece 343. In one embodiment, the bushing 345 is a cylindrical shell made of Delrin AF™—a thermoplastic well known in the industry.

An aluminum ring 367 (e.g., 7075-T6) having a plurality of resiliently bendable fingers integrally protruding from it in a uniform circular manner is screwed in or otherwise mounted into a finger accommodating cavity 344 provided in body 343 as shown. In one embodiment, the base ring 367, elastic finger stems 366 and finger tips 361 are part of a monolithic integrated structure that is machined from a cylindrical tube of aluminum by lathing, boring a vertical opening behind finger stems 366 and milling slots between the fingers to free them for independent flexion. Then a conical head piece is pressed against the tops of the finger tips 361 to urge them uniformly inwards towards the central axis of the ring 367 while heat is applied to induce stress relief deformation. At the end of the heat and stress deformation process, the fingers remain bent inwardly slightly so as to provide a desired amount of resilient tension against the lowering of cam head 351. The amount of spring tension in finger stems 366 can vary from application to application and will also depend on counter tension supplied by compression spring 357. The compression spring 357 (stainless steel in one embodiment) urges the post 350 to reciprocate downwardly against the lesser resistance of the spring-wise contracted fingers 360. When sufficient upward air pressure is applied to piston 330, the combined forces of the air pressure and the springiness of the contracted fingers 360 pushes the post 350 up to thereby allow the fingers 360 to contract. When the upward air pressure is removed, the compression spring 357 forces the cam head 351 down into the clamping position. In one embodiment, the conical deformation process that brings the fingers to normally incline slightly inward towards the central axis of ring 367 includes press-fitting the finger assembly, fingers first, and fastening them into a conical shaping mold (e.g., made of stainless steel), heating the mold and fingers in an oven at a temperature of about 250° C. for about 2 hours and then air cooling at room temperature. The in-mold heating process stress relieves the fingers to take on an inwardly inclined normal (unstressed) mode. Pushing cam 351 down inside the finger assembly strains the fingers out of this normal mode. Many other methods can, of course, be used for resiliently urging the alignment fingers to spread out uniformly as the cam head 351 is brought down in the −Z direction. The specific amount of tension, normal inclination, etc. will vary from application to application.

During assembly, the compression spring 357 is inserted into bottom cavity 348 of the main body 343 while the post 350 is lowered through bushing 345 to spread apart the pre-mounted fingers 360. A retaining screw 333 (e.g., coated with a locking compound, i.e. Loctite™) is threaded through an opening in piston piece 332 to mate the latter with the bottom of post stem 356. In one embodiment, the piston piece 332 is made of aluminum (6061-T6) and is machined to further include a centering groove at its top side for alignably receiving the bottom of the compression spring 357. A quad-type sealing ring 331 made, for example, of Buna™ plastic (a high-impact polystyrene vinyl material known in the industry) is fitted in the sealing groove of the piston piece 332 so as to slidingly seal against the cylindrical inner wall of spring cavity 348. A spring centering recess is provided at the top of spring cavity 348. A wider cylindrical opening 347 is machined below spring cavity 348 to mate with a rotatable, air pressure providing table (not shown). The assembled aligning and clamping device 340 is screw fastened or otherwise fastened centrally onto the air pressure providing table. In one embodiment, prior to insertion of the post 350 and during assembly, an alignment tube (e.g., made of stainless steel) is temporarily press fitted between the outer diameter of low-friction bushing 345 and the circular inner diameter of the base 367 of finger assembly 360 to center the finger assembly before it fastened by screws or otherwise to main body portion 343.

Referring to the first cross sectional and magnified view 360' of one of the fingers and the supporting base ring 367, there are several detailed aspects to the front side contour, 361' and to the back side contour, 364-365 of the finger tip 360'. The back side contour includes an alignment engagement section 365 which slides against a counterpart, low-friction alignment engagement section 355 of the descending cam head 351 during an initial alignment phase of the aligning and clamping operation. At that time, the finger tip front side contours 361' are pressing against the inner diameters of the alignment holes in the supplied plates 310-320 to shift those holes into co-alignment with one another and with the central vertical axis of body 343 while the body is secured to the rotatable table. The low-friction outer surface of the post's alignment engagement section 355 helps to reduce wearing down of finger's alignment engagement section 365 during repeated use. The hardness of the top surface of platter 341 (e.g., stainless steel) also helps to reduce wear and tear due to repeated droppings of plates 310-320 onto that surface.

As the descending cam head 351 continues to lower against the fingers, the clamping pressure applying, sloped and curved portion 354 (stainless steel) begins to engage against the counterpart, clamping pressure receiving section 364 of each finger. This applies a greater alignment and clamping-down force against the plates 310-320 than was applied during the initial alignment phase. Removal of intersurface fluids by centrifical rotation or otherwise should have begun at this time. As the intersurface fluids escape and the plates draw ever closer together, the front side contour, 361" of each finger tilts into a slightly angled relationship with the vertical inner diameter surface 314 of the uppermost plate 310 as is shown schematically in the second magnified view 315a of one of the fingers 360". In one embodiment, due to a radius of curvature machined between the top surface 311 of the uppermost plate 310 and the precision inner diameter surface 314 of its alignment hole, the front side contour, 361" of each finger makes an angle of about 6 with the vertical inner diameter surface 314 so as to apply both a downward clamping force against the plates 310-320 and a lateral centering force without contacting the top surface 311 of the uppermost plate 310. The magnitudes of the various applied forces, angles, surface contours, etc. may vary from application to application and may be determined empirically, as also may be the forces and compositions of the compression spring 357, the finger stems 366 and the air pressure applied to piston 330. Computer modeling 390 may be used to determine and specify the various forces, angles, surface contours, materials, etc. of the aligning and clamping device 340 for each given application. Once a prototype has been fabricated from computer-produced specifications and successfully tested for desired performance, the specifications (e.g., stored on disk 394) may be forwarded to a mass production facility for replication of the devised aligning and clamping device.

Over time, the fingers tend to wear out from repeated stressing and should be replaced with new ones before the stressed finger material fails. If failure occurs nonetheless, the fast spinning plates 310-320 may tend to fly off the post due to loss of clamp-down and centering forces. To prevent this from happening, a plate corralling recess 352 is machined into the top of the cam head just above the plate drop-down slope 353. Drop-down slope 353 allows the robotic arm (see 201 of FIG. 2A) to deposit the plates with some degree of error onto the post 350 before alignment and clamping commences.

During normal usage, the fingers 360 should not spread out so far as to collide with the inner diameters of accommodating cavity 344 or hard platter 341. However, it is possible during assembly that excessive force is used to post 350 down so as to fasten the piston 330 to the bottom of stem 356. A hard-stop recess 368 is carved into the fingers as shown for latching against the platter 341 in such an event and preventing the cam head 351 from being pushed yet further down such that it might possibly alter the resiliency of the stress-relived finger stems 366.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example, it is understood that the contouring and dimensioning of the cam head surfaces 354-355 and finger surfaces 361, 364, 365 can vary from application to application and that computer modeling (390) may be beneficial to determining what forces will develop as the cam head 351 is brought down to have its respective alignment engagement section 355 and its clamping pressure applying, sloped section 354 engage with corresponding engagement sections 365 and 364 of the fingers and as the countered front sides 361 of the finger tips engage with the alignment surfaces (e.g., 314) of the alignment holes (not necessarily circular or entirely vertical) provided in the supplied plates 310-320 or other mateable objects. As such, it is within the contemplation of the disclosure that computer models can be fashioned in an appropriate computer (e.g., 390 of FIG. 3) to model the behaviors of one or more of the alignment fingers, cam, alignment holes and other parts of the systems described herein and that such computer models can be used to intelligently modify materials and/or contours as may be appropriate for achieving desired alignment and or clamping objectives on an application by application basis. The finalized models may be used for also generating human readable and/or computer readable specifications for machining one or more of the various surface contours and parts of the aligning and clamping device (340 or other) as may be appropriate. A computer-readable medium or another form of a software product or machine-instructing means (including but not limited to, a hard disk, a compact disk, a flash memory stick, a transmission of manufactured instructing signals over a network and/or like software products) may therefore be fashioned in accordance with the invention for instructing an instructable machine to carry out such modeling, design modification and/or generation of specifications. The specifications for the designed aligning and clamping device (340 or other) may forwarded in various forms, including but not limited to transmission of manufactured instructing signals over a network and/or conveyance by a hard disk, a compact disk, a flash memory stick or conveyance as hard copy instructions or otherwise to a manufacturing site for enabling manufacture of one or more aligning and clamping device (340 or other) in accordance with such specifications. Item 394 of FIG. 3 represents one or both of modeling instructions and device manufacturing specifications as may be input and/or output to/from the modeling and specifications computer 390.

Specifications for the clamping device 350 may alternatively or additionally define the sequence in which aligning and clamping actions are taken and to what levels of respective tolerance and force. One version of a clamping device might be specified to perform coarse alignment first, then a low force first clamping action, then a further alignment, then a fluid removal operation, then further clamping at a higher force, and so forth.) Specifications for the clamping device 350 may additionally or alternatively define the degree of parallelism required between the top platter surface (e.g., 341) and the base of the main body portion (343). In one embodiment, for example, the degree of parallelism specified calls for an angle between the top platter surface 341 and the base plane of the main body portion 343 not exceeding a rise of $4\times10^{-5}$ inch for a run of 1.078 inches. (Ideally, the rise would be an absolute zero for a finite run, but this is near impossible to achieve in the real world.) Specifications for the clamping device 350 may additionally or alternatively define the degree of concentricity required within a symmetrical feature (e.g., among plural fingers) and/or between two or more symmetrical features of the clamping device. In one embodiment, for example, the degree of concentricity specified calls for an offset of no more than 0.001 inch between the central vertical axis of stem portion 356 and the central vertical axis of the finger assembly 360 after the two are assembled into the main body portion 343. (Ideally, the concentricity offset would be an absolute zero, but this is near impossible to achieve in the real world for objects that are not part of a monolithically machined unit. It is near impossible to achieve even for circular or other symmetrical features that are distinct part of a monolithic and machine shaped unit.) Specifications for the clamping device 350 may additionally or alternatively define the desired minimum hardness of one or more surfaces, the desired minimum lifetime of usage for one or more parts of the clamping device (e.g., the fingers), the desired maximum amount surface roughness permitted on critical surfaces, and so forth. The various specifications for defining attributes of the to-be-manufactured clamping device, including for example the sequence in which aligning and clamping actions are taken and to what levels of respective tolerance and force may be included in data conveyance item 394 or in a separate data conveyance item 395 that provides ancillary, manufactured specifications for the making and/or using of the clamping device. It is therefore understood that specifications for the desired structure and/or operations of the clamping device may be provided in a variety manufactured forms including one or more of providing modeling instructions and device manufacturing specifications and device operation specifications and that such may be input and/or output to/from computers such as 390 alone or in unison for controlling the manufacture of one or more clamping devices as may be desired in given applications.

It is also within the scope of the present disclosure, as mentioned above, to have an instructable machine (e.g., computer 290) control the movement of the post and/or fingers and/or control the removal (291-293) of the intersurface fluids so as to better time the application of various alignment and/or clamping forces to the objects (e.g., discs) that are to be co-aligned and clamped together. As such, a software product 294 adapted for causing an instructable machine to carry out such machine-implemented control of one or more of the alignment, clamping and fluid removal process disclosed herein is also within the scope of the disclosure.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A device for aligning and clamping together two or more mateable objects where said objects have corresponding alignment holes defined in said objects, the device comprising:
    (a) a plurality of movable aligning fingers;
    (b) retraction means for causing the aligning fingers to move into a retracted state where they occupy a first volumetric space sufficiently small to allow two or more of the mateable objects to be moved over the retracted fingers so as to have the respective alignment holes of the moved objects surrounding the retracted aligning fingers;
    (c) expansion means for urging the fingers to expand outwardly to occupy a second volumetric space greater than the first volumetric space such that the fingers begin to contact and begin to improve co-alignment between surfaces of the surrounding alignment holes, where substantial outward expansion of the fingers is to occur after the objects have been moved over the retracted fingers; and
    (d) clamping means for applying a clamping force for clamping the two or more mateable objects together as their respective alignment holes remain in alignment or continue to improve in said co-alignment between the surfaces of the surrounding alignment holes, where the clamping force is to be applied after the alignment holes of said objects have begun to come into said improved co-alignment.

2. The aligning and clamping device of claim 1 and further comprising:
    (e) fluid removing means for removing at least one of air and other fluids from between the objects as the objects are urged into clamped alignment with one another.

3. The aligning and clamping device of claim 2 wherein:
    (a.1) at least two of said movable aligning fingers are spring mounted to a supporting base.

4. The aligning and clamping device of claim 2 wherein:
    (a.1) at least two of said movable aligning fingers each includes a monolithically integrated spring forming part of said retraction means.

5. The aligning and clamping device of claim 2 wherein:
    (a.1) at least one of said movable aligning fingers includes:

(a.1a) an alignment engagement section which operatively couples to said expansion means at least during initial expansion of the fingers; and (a.1b) a clamping pressure receiving section which operatively couples to said clamping means at least during said application of the clamping force.

6. The aligning and clamping device of claim 2 wherein:
(b.1) said retraction means includes a piston that is moved by pressure applied from a pressure-supplying fluid.

7. The aligning and clamping device of claim 6 wherein:
(b.1) said retraction means includes an electrically controlled valve that can be used to selectively move the piston.

8. The aligning and clamping device of claim 2 wherein:
(b.1) said retraction means is controlled by a computer that also coordinates movements of a robotic means that moves one or more of said mateable objects over the retracted fingers and/or off the retracted fingers.

9. The aligning and clamping device of claim 2 wherein:
(c.1) said expansion means includes a resilient means for resiliently urging the fingers to expand outwardly.

10. The aligning and clamping device of claim 9 wherein:
(d.1) said clamping means use the same resilient means for resiliently applying the clamping force.

11. An apparatus for aligning and clamping together two or more mateable objects where said objects have corresponding alignment holes defined in said objects, the apparatus comprising:

(a) a plurality of movable aligning fingers;
(b) a fingers retractor structured for causing the aligning fingers to move into a retracted state wherein the retracted state fingers occupy a first volumetric space sufficiently small to allow two or more of the mateable objects to be moved over the retracted fingers so as to have the respective alignment holes of the moved objects surrounding the retracted state fingers;
(c) a fingers expander structured for urging the fingers to expand outwardly to occupy a second volumetric space greater than the first volumetric space such that the fingers begin to contact and begin to improve co-alignment between surfaces of the surrounding alignment holes, the fingers expander being deployable after the objects have been moved over the fingers;
(d) a damper structured for applying a clamping force that clamps the two or more mateable objects together as their respective alignment holes remain in alignment or continue to improve in said co-alignment between the surfaces of the surrounding alignment holes, the clamper being deployable after the fingers expander has been deployed to thereby improve co-alignment between surfaces of the surrounding alignment holes; and
(e) a fluid remover structured to remove at least one of air and other fluids from between the objects as the objects are urged into clamped alignment with one another, the fluid remover being operatively coupled to the objects.

12. The apparatus of claim 11 and further comprising:
a computer controllable first actuator structured to actuate the fingers expander into the fingers expanding mode under control of a corresponding computerized controller.
a computer controllable second actuator structured to control force of fluid removal by the fluid remover under control of the computerized controller.

* * * * *